US010739990B1

(12) United States Patent
Despotuli

(10) Patent No.: US 10,739,990 B1
(45) Date of Patent: Aug. 11, 2020

(54) GESTURE-BASED MOBILE DEVICE USER INTERFACE

(71) Applicant: Leonid Despotuli, Chernogolovka (RU)

(72) Inventor: Leonid Despotuli, Chernogolovka (RU)

( * ) Notice: Subject to any disclaimer, the term of this patent is extended or adjusted under 35 U.S.C. 154(b) by 285 days.

(21) Appl. No.: 15/382,683

(22) Filed: Dec. 18, 2016

(51) Int. Cl.
*G06F 3/0488* (2013.01)

(52) U.S. Cl.
CPC ................. *G06F 3/04883* (2013.01)

(58) Field of Classification Search
CPC .................................................. G06F 3/04883
See application file for complete search history.

(56) References Cited

U.S. PATENT DOCUMENTS

| 8,448,083 B1 * | 5/2013 | Migos ................. G06F 3/04883 345/671 |
| 2009/0051648 A1 * | 2/2009 | Shamaie ................. G06F 3/017 345/156 |
| 2013/0074014 A1 * | 3/2013 | Ouyang ................. G06F 3/0488 715/863 |
| 2013/0293504 A1 * | 11/2013 | Heinrich ................. G06F 3/017 345/173 |
| 2014/0109016 A1 * | 4/2014 | Ouyang ................. G06F 17/24 715/856 |
| 2014/0223382 A1 * | 8/2014 | Hicks ................. G06F 3/04883 715/863 |
| 2014/0298223 A1 * | 10/2014 | Duong ................. G06F 3/04842 715/765 |
| 2015/0372810 A1 * | 12/2015 | Miller ................. H04L 9/0822 713/183 |
| 2016/0077734 A1 * | 3/2016 | Buxton ................. G06F 3/04842 715/773 |
| 2016/0239200 A1 * | 8/2016 | Fang ................. G06F 3/04883 |
| 2019/0056725 A1 * | 2/2019 | Su ................. B64C 39/024 |

* cited by examiner

*Primary Examiner* — Stephen S Hong
*Assistant Examiner* — Ahamed I Nazar
(74) *Attorney, Agent, or Firm* — Bardmesser Law Group

(57) ABSTRACT

A computer-implemented method being performed in connection with a mobile computer system comprising a central processing unit, a touchscreen and a memory, the computer-implemented method comprising: detecting a gesture performed by a user across the touchscreen, where in the gesture comprises a plurality of unidirectional or circular motions performed by the user over substantially the same area; determining at least one characteristic of the detected gesture; and selecting a command for execution by the central processing unit of the mobile computer system based on the at least one determined characteristic of the detected gesture.

19 Claims, 2 Drawing Sheets

GESTURE-BASED MOBILE DEVICE USER INTERFACE

BACKGROUND OF THE INVENTION

Technical Field

The disclosed embodiments relate in general to mobile device design, more specifically, to a gesture-based mobile device user interface.

Description of the Related Art

Gesture-based user interfaces for computing devices are becoming increasingly popular. However, the conventional technology is still deficient in its ability to provide user interfaces that would be based on simple gestures, easily performed by a user in connection with a touchscreen of a mobile smartphone or a tablet. Therefore, new and improved gesture-based mobile device user interfaces are needed.

SUMMARY OF THE INVENTION

The embodiments described herein are directed to methods and systems that substantially obviate one or more of the above and other problems associated with conventional technology.

In accordance with one aspect of the inventive concepts described herein, there is provided a computer-implemented method being performed in connection with a mobile computer system comprising a central processing unit, a touchscreen and a memory, the computer-implemented method comprising: detecting a gesture performed by a user across the touchscreen, wherein the gesture comprises a plurality of continuous back-and-force linear motions or continuous circular motions performed by the user over a gesture area; determining at least one characteristic of the detected gesture; and selecting a command for execution by the central processing unit of the mobile computer system based on the at least one determined characteristic of the detected gesture.

In one or more embodiments, in one or more embodiments, the at least one determined characteristic of the detected gesture is a direction of the gesture.

In one or more embodiments, the at least one determined characteristic of the detected gesture is a rotational direction of the gesture.

In one or more embodiments, the at least one determined characteristic of the detected gesture is a horizontal direction of the gesture.

In one or more embodiments, the at least one determined characteristic of the detected gesture is a vertical direction of the gesture.

In one or more embodiments, the at least one determined characteristic of the detected gesture is a diagonal direction of the gesture.

In one or more embodiments, the at least one determined characteristic of the detected gesture is a location of an originating point of the gesture.

In one or more embodiments, the at least one determined characteristic of the detected gesture is a location of a center point of the gesture.

In one or more embodiments, the at least one determined characteristic of the detected gesture is a number of unidirectional or circular motions of the gesture.

In one or more embodiments, the gesture is performed by a single finger or a stylus.

In one or more embodiments, the dimension of the gesture area is less than one inch.

In one or more embodiments, the at least one determined characteristic of the detected gesture is a location of the gesture or an object of the touchscreen over which the gesture is performed.

In accordance with another aspect of the inventive concepts described herein, there is provided a non-transitory computer-readable medium comprising a set of instructions, which, when executed in connection with a computer system comprising a central processing unit, a touchscreen and a memory, cause the computer system to perform a method comprising: detecting a gesture performed by a user across the touchscreen, wherein the gesture comprises a plurality of continuous back-and-force linear motions or continuous circular motions performed by the user over a gesture area; determining at least one characteristic of the detected gesture; and selecting a command for execution by the central processing unit of the mobile computer system based on the at least one determined characteristic of the detected gesture.

In one or more embodiments, in one or more embodiments, the at least one determined characteristic of the detected gesture is a direction of the gesture.

In one or more embodiments, the at least one determined characteristic of the detected gesture is a rotational direction of the gesture.

In one or more embodiments, the at least one determined characteristic of the detected gesture is a horizontal direction of the gesture.

In one or more embodiments, the at least one determined characteristic of the detected gesture is a vertical direction of the gesture.

In one or more embodiments, the at least one determined characteristic of the detected gesture is a diagonal direction of the gesture.

In one or more embodiments, the at least one determined characteristic of the detected gesture is a location of an originating point of the gesture.

In one or more embodiments, the at least one determined characteristic of the detected gesture is a location of a center point of the gesture.

In one or more embodiments, the at least one determined characteristic of the detected gesture is a number of unidirectional or circular motions of the gesture.

In one or more embodiments, the gesture is performed by a single finger or a stylus.

In one or more embodiments, the dimension of the gesture area is less than one inch.

In one or more embodiments, the at least one determined characteristic of the detected gesture is a location of the gesture or an object of the touchscreen over which the gesture is performed.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement a novel user interface for controlling a mobile computing device equipped with a touchscreen using one or more gestures performed by the user in connection with the aforesaid touchscreen. In one or more embodiments, the aforesaid mobile computing device is programmed to detect and recognize one of a plurality of gestures performed by the user. One the user's gesture has been detected and recognized, an appropriate action could be executed, such as a command to be executed by the mobile computing device.

Figure 1:
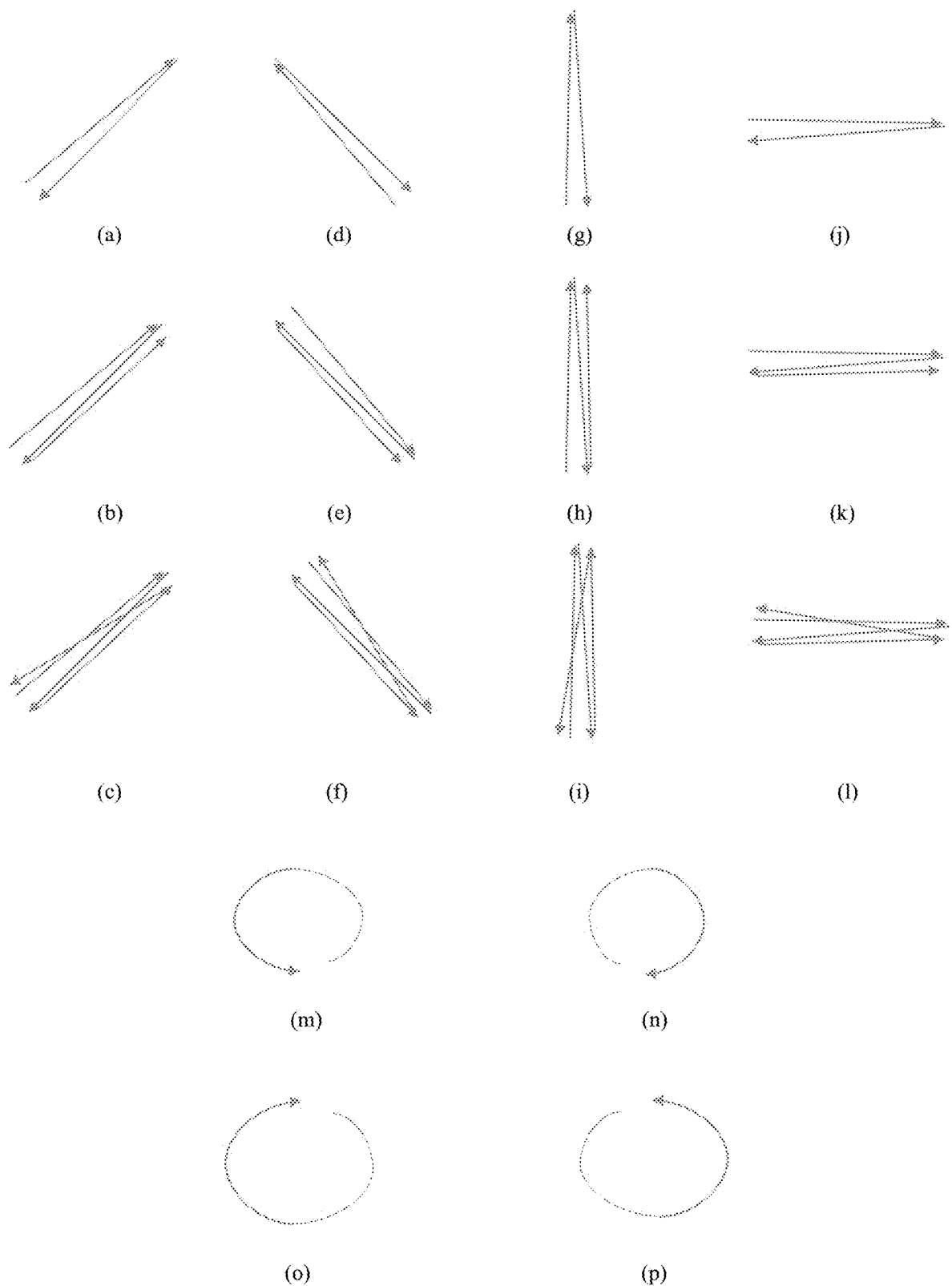
FIG. 1 illustrates exemplary embodiments of mobile computing device control gestures (a) through (p).

FIG. 1 illustrates exemplary embodiments of mobile computing device control gestures (a) through (p). In one or more embodiments, the aforesaid plurality of exemplary gestures (a) through (p) shown in FIG. 1 are performed by the user using user's finger or stylus swiped or otherwise moved across the touchscreen of the mobile computing device. The touchscreen of the mobile computing device detects the aforesaid gestures using, for example, capacitive changes, and digitizes the determined location of the user's finger during the entire time period when the gesture is performed by the user. This information on the location of the user's finger on the touchscreen is then sent to the central processing unit of the mobile computing device.

In various embodiments, at least some of the aforesaid gestures may be performed by the user in either direction. In one embodiment, the function or the command executed by the mobile computing device in response to the detection of the gesture may vary depending on the gesture's direction. For example, if the gesture is performed from left to right, then the mobile computing device executes a command A. If the gesture is performed from right to left, then the mobile computing device executes a command B. The same could be accomplished with circular gestures. A clockwise gesture (n) may trigger a command C, which a counterclockwise gesture (m) may trigger execution of a command D. In alternative embodiment, a horizontal gesture, as gestures (j), (k) and (l) in FIG. 1 would trigger a command X, while vertical gestures, such as gestures (g), (h) and (i) in FIG. 1, would trigger execution of a command Y. Finally, diagonal gestures, such as gestures (a) through (f) in FIG. 1, would trigger execution of a command Z. In various embodiments, the direction of the diagonal gesture may also be used, such as left bottom to right top or right bottom to left top to select the specific command for execution.

In one embodiment, the function or the command executed by the mobile computing device in response to the detection of the gesture may vary depending on the gesture's originating point. For example, if the gesture starts from the top portion of the screen, then the mobile computing device executes a command E, see, for example, gestures (o) and (p) in FIG. 1. On the other hand, if the gesture originates from the bottom portion of the screen, as gestures (m) and (n), then the mobile computing device executes a command F. As would be appreciated by persons of ordinary skill in the art, positions of other points of the gesture may be also used in selecting the command to be executed. Such point may be, for example, the center point of the gesture, the end point of the gesture, etc. In addition, the relative positions of different point of the gesture may be similarly used, such as relative position of the initial point vs. position of the center point vs. position of the endpoint.

In one embodiment, the function or the command executed by the mobile computing device in response to the detection of the gesture may vary depending on the number of identifiable finger movements constituting the gesture. In exemplary gestures (a) through (l) shown in FIG. 1, such an identifiable movement would be a finger movement in one direction. In one embodiment, the gesture involves multiple movements back and forth in one particular direction. Thus, the system of such an embodiment would be configured to count such unidirectional movements and generate a command or other function based on the counted number of movements. For example, if the system counts three movements as in gestures (b), (e), (h) and (k) of FIG. 1, then a command G is executed. If the system counts four movements, such in gestures (c), (f), (i) and (l) of FIG. 1, then a command H is executed. In one or more embodiments, the above-described gestures may be carried out by the user using one finger and/or a stylus.

The functions or commands whose execution could be triggered based on the above-described gestures may include common functions of the tablet or smartphone, such as wake up command, password entry command, scroll command, or a command for launching a specific application. For example, command A may trigger the launch of application A, while command B would trigger launch of application B. As would be appreciated by persons of ordinary skill in the art, the present invention is not limited to specific command or a set of commands that could be triggered using the described gesture techniques. As would be appreciated by persons of ordinary skill in the art, the described gestures may be used instead of functional buttons on the smartphone or a tablet, such as back function, menu function, etc.

It should be further noted that in one or more embodiments, movements constituting the gesture may be performed by the user locally with a small amplitude to call those or other contextual functions of the tablet or smartphone. In various embodiments, the movements may be tied to a specific area of the screen. In one or more embodiments, the amplitude of the motion(s) comprising the gesture is small compared to the size of the screen. For example, in one embodiment, the magnitude of the gesture motion may be less than one inch. In another embodiment, the magnitude of the gesture motion may be less than one centimeter. Consequently, the size of the area of the screen over which the gesture is performed may also be small compared to the overall size of the screen. In the respective aforesaid embodiments, the size of this area may be one inch and one centimeter, respectively.

In an additional embodiment, the executed functions may depend on context (e.g. the current state of the mobile computing device or any application). Thus, the gestures and executed functions may vary based on the currently active mobile application.

As would be appreciated by persons of ordinary skill in the art, the concepts described herein are not limited to the user in connection with smartphones and may be utilized in any mobile devices, such as tablet computers or smart watches. In addition, one or more features described above may be combined in a single mobile device.

Figure 2:
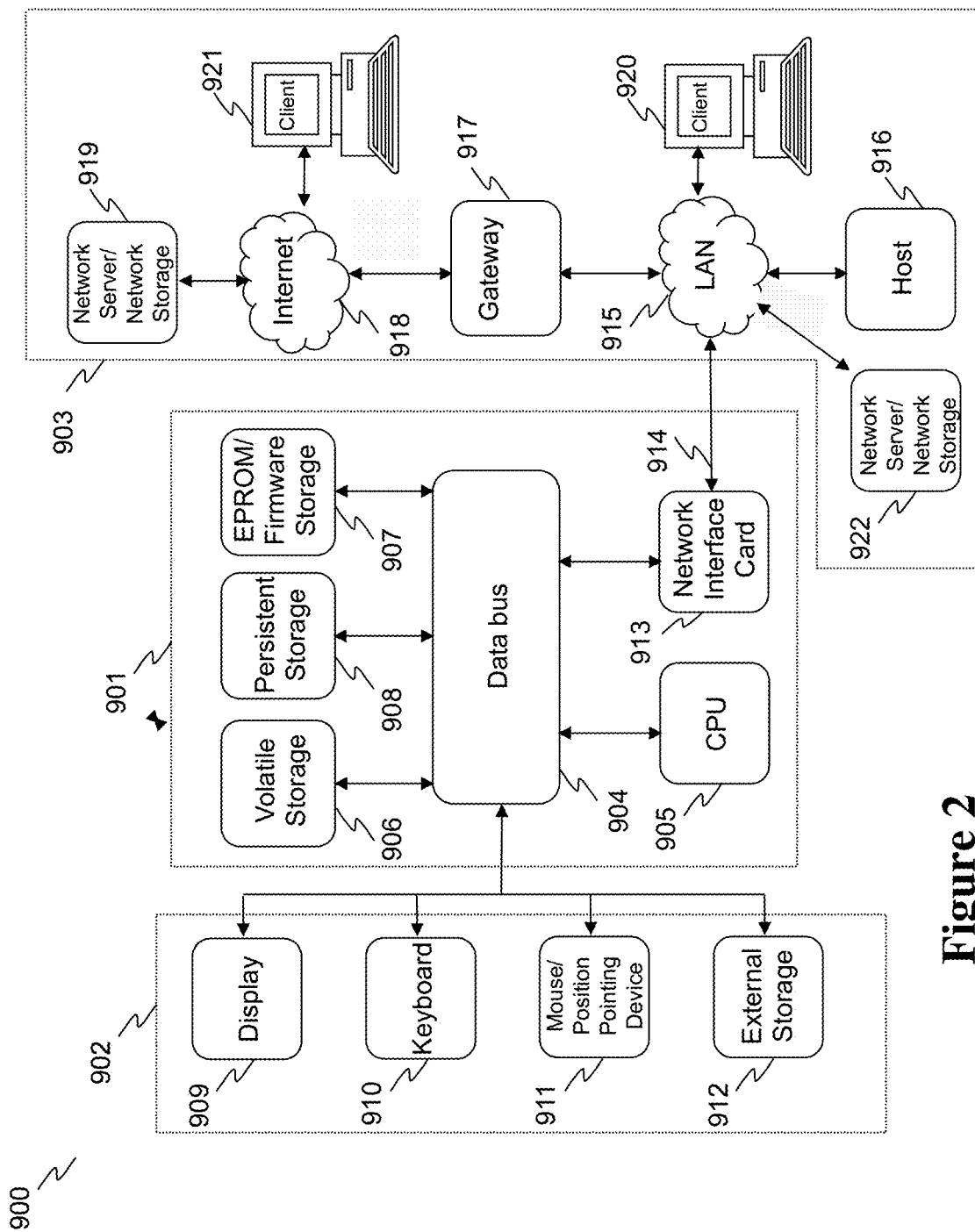
FIG. 2 illustrates an exemplary embodiment of a mobile computing platform upon which the described embodiments may be implemented.

FIG. 2 illustrates an exemplary embodiment of a mobile computer platform upon which the inventive system may be implemented. Specifically, FIG. 2 represents a block diagram that illustrates an embodiment of a mobile computer system 900 upon which an embodiment of the inventive methodology may be implemented. The system 900 includes a mobile computer platform 901, peripheral devices 902 and network resources 903.

In one or more embodiments, the computer platform 901 may include a data bus 904 or other communication mechanism for communicating information across and among various parts of the computer platform 901, and a processor 905 coupled with bus 904 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 904 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 904 for communicating information and command selections to processor 905. Another type of user input device is cursor control device 911, such as a mouse, a trackball, or cursor direction keys for communicating direction information and command selections to processor 905 and for controlling cursor movement on display 909. This input device typically has two degrees of freedom in two axes, a first axis (e.g., x) and a second axis (e.g., y), that allows the device to specify positions in a plane.

An external storage device 912 may be coupled to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 908. Volatile media includes dynamic memory, such as volatile storage 906.

Common forms of computer-readable media include, for example, a floppy disk, a flexible disk, hard disk, magnetic tape, or any other magnetic medium, a CDROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infrared transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 915 that is coupled to a local network 915. For example, communication interface 913 may be an integrated services digital network (ISDN) card or a modem to provide a data communication connection to a corresponding type of telephone line. As another example, communication interface 913 may be a local area network interface card (LAN NIC)

to provide a data communication connection to a compatible LAN. Wireless links, such as well-known 802.11a, 802.11b, 802.11g and Bluetooth may also be used for network implementation. In any such implementation, communication interface 913 sends and receives electrical, electromagnetic or optical signals that carry digital data streams representing various types of information.

Network link 914 typically provides data communication through one or more networks to other network resources. For example, network link 914 may provide a connection through local network 915 to a host computer 916, or a network storage/server 917. Additionally or alternatively, the network link 914 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 915 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 915 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. Various aspects and/or components of the described embodiments may be used singly or in any combination in the mobile computing device with a touchscreen. It is intended that the specification and examples be considered as exemplary only, with a true scope and spirit of the invention being indicated by the following claims.

What is claimed is:

1. A computer-implemented method being performed in connection with a mobile computer system comprising a central processing unit, a touchscreen and a memory, the computer-implemented method comprising:
    a. detecting a gesture performed by a user across the touchscreen, wherein the gesture comprises a plurality of continuous back-and-forth linear motions, all of them along one direction, that includes at least first, second, third and fourth separate linear motions, such that the fourth separate linear motion overlaps or intersects the first and second separate linear motions, that are treated as a single gesture, performed by the user over a gesture area;
    b. determining at least one characteristic of the detected gesture; and
    c. selecting a command for execution by the central processing unit of the mobile computer system based on the at least one determined characteristic of the detected gesture.

2. The computer-implemented method of claim 1, wherein the at least one determined characteristic of the detected gesture is a direction of the gesture.

3. The computer-implemented method of claim 1, wherein the at least one determined characteristic of the detected gesture is a rotational direction of the gesture.

4. The computer-implemented method of claim 1, wherein the at least one determined characteristic of the detected gesture is a horizontal direction of the gesture.

5. The computer-implemented method of claim 1, wherein the at least one determined characteristic of the detected gesture is a vertical direction of the gesture.

6. The computer-implemented method of claim 1, wherein the at least one determined characteristic of the detected gesture is a diagonal direction of the gesture.

7. The computer-implemented method of claim 1, wherein the at least one determined characteristic of the detected gesture is a location of an originating point of the gesture.

8. The computer-implemented method of claim 1, wherein the at least one determined characteristic of the detected gesture is a location of a center point of the gesture.

9. The computer-implemented method of claim 1, wherein the at least one determined characteristic of the detected gesture is a number of unidirectional or circular motions of the gesture.

10. The computer-implemented method of claim 1, wherein the at least one determined characteristic of the detected gesture is a location of the gesture or an object of the touchscreen over which the gesture is performed.

11. A non-transitory computer-readable medium comprising a set of instructions, which, when executed in connection with a computer system comprising a central processing unit, a touchscreen and a memory, cause the computer system to perform a method comprising:
    a. detecting a gesture performed by a user across the touchscreen, wherein the gesture comprises a plurality of continuous back-and-forth linear motions, all of them along one direction, that includes at least first, second, third and fourth separate linear motions, such that the fourth separate linear motion overlaps or intersects the first and second separate linear motions and are treated as a single gesture, performed by the user over a gesture area;
    b. determining at least one characteristic of the detected gesture; and c. selecting a command for execution by the central processing unit of the mobile computer system based on the at least one determined characteristic of the detected gesture.

12. The non-transitory computer-readable medium of claim 11, wherein the at least one determined characteristic of the detected gesture is a direction of the gesture.

13. The non-transitory computer-readable medium of claim 11, wherein the at least one determined characteristic of the detected gesture is a rotational direction of the gesture.

14. The non-transitory computer-readable medium of claim 11, wherein the at least one determined characteristic of the detected gesture is a horizontal direction of the gesture.

15. The non-transitory computer-readable medium of claim 11, wherein the at least one determined characteristic of the detected gesture is a vertical direction of the gesture.

16. The non-transitory computer-readable medium of claim 11, wherein the at least one determined characteristic of the detected gesture is a diagonal direction of the gesture.

17. The non-transitory computer-readable medium of claim 11, wherein a dimension of the gesture area is less than one inch.

18. The non-transitory computer-readable medium of claim 11, wherein the at least one determined characteristic of the detected gesture is a location of the gesture or an object of the touchscreen over which the gesture is performed.

19. The medium of claim 11, wherein at least one of the four separate linear motions intersects at least another of the four separate linear motions.

* * * * *